J. P. NOAH.
NUT LOCK.
APPLICATION FILED JAN. 14, 1921.
1,389,006.
Patented Aug. 30, 1921.
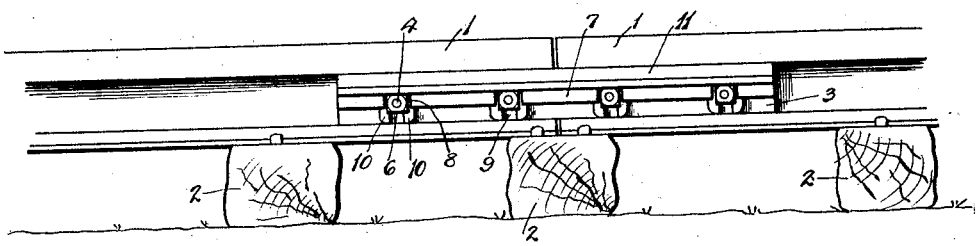
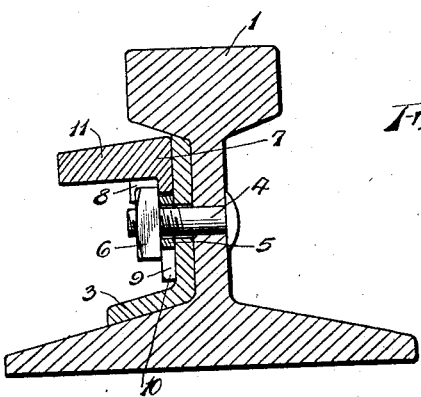
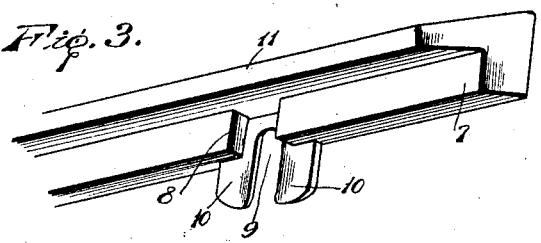
Inventor
J. P. Noah.
By
Lacy & Lacy, Attorneys

UNITED STATES PATENT OFFICE.

JOHN P. NOAH, OF GALENA, ILLINOIS.

NUT-LOCK.

1,389,006.  Specification of Letters Patent.  Patented Aug. 30, 1921.

Application filed January 14, 1921. Serial No. 437,232.

*To all whom it may concern:*

Be it known that I, JOHN P. NOAH, a citizen of the United States, residing at Galena, in the county of Jo Daviess and State of Illinois, have invented certain new and useful Improvements in Nut-Locks, of which the following is a specification.

The object of this invention is to provide simple and inexpensive means whereby the nuts upon bolts in rail joints may be effectually held against release and also protected against weather and other corrosive elements. The invention seeks to provide a device for the stated purpose which may be very easily applied and which will not be apt to work loose under the vibration from passing trains. The stated objects and other objects which will incidentally appear in the course of the following description are attained in such a device as is illustrated in the accompanying drawings and the invention resides in certain novel features which will be particularly pointed out in the appended claim.

In the drawings—

Figure 1 is a side elevation of rail joint having my improvements applied thereto;

Fig. 2 is a transverse section;

Fig. 3 is a detail perspective view of a portion of the lock.

The rails 1 may be of the usual type and are supported upon ties 2 in a well-known manner. A fish plate 3 is applied to the rails so as to bridge the joint between them and the fastening bolts 4 are inserted through alined openings in the rails and the fish plate in the usual manner. A washer 5 is fitted upon each bolt against the fish plate and a nut 6 is mounted upon the end of the bolt to bear upon said washer. The locking bar 7 is provided in its lower edge with a plurality of flat-sided notches 8 which are adapted to engage the sides of the respectively adjacent nuts 6 and the rear walls of the notches are slotted, as shown at 9, so as to engage the washers, depending lugs or extensions 10 being formed on the lower edge of the locking bar to form guides for the bar while it is being placed in position and also to provide an extended bearing for the bar against the fish plate. On the outer face of the locking bar along the upper edge thereof, I provide an outwardly projecting overhanging ledge or shelf 11 which extends outwardly beyond the nuts and the ends of the bolts and prevents the access of rain or snow to the nuts and the bolts and also turns aside water of condensation from passing locomotives.

In applying the device to a rail joint, the washers are fitted upon the bolts and the nuts turned home against the washers, after which the locking bar is canted so that the lugs 10 may engage behind the nuts and at the sides of the washers. As the locking bar is passed downwardly behind the nuts it will be turned to the position shown in Fig. 2 so that the notches 8 will engage the nuts and the ledge or shelf 11 will project outwardly over the nuts. The engagement of the lugs 10 with the washers effectually prevents endwise movement of the locking bar and the engagement of the flat sides of the nuts positively prevents rotation of the nuts so that the bolts cannot work loose and permit separation of the rails. A great objection to the rail joints now generally employed is the corrosion of the nuts upon the bolts under the action of the weather elements and from the water of condensation dripping from passing locomotives. This objection is entirely overcome by my device in which the shelf or ledge 11 forms a complete and ample roof or guard for the nuts and the ends of the bolts as is clear from the drawings. The device is exceedingly simple in construction and may be produced and applied at a very low cost.

Having thus described the invention, what is claimed as new is:

In a rail joint, the combination with track rails, bolts inserted therethrough, washers on the bolts, and nuts fitted on the bolts against the washers, of a locking bar having depending lugs to span the washers and provided with flat-sided notches at the outer sides of said lugs to engage the nuts.

In testimony whereof I affix my signature.

JOHN P. NOAH. [L. S.]